US011615077B1

(12) United States Patent
Sroka et al.

(10) Patent No.: US 11,615,077 B1
(45) Date of Patent: Mar. 28, 2023

(54) EDITABLE RULES-BASED MODEL SYSTEM

(71) Applicant: Microsoft Technology Licensing, LLC, Redmond, WA (US)

(72) Inventors: Michal Adam Sroka, Copenhagen (DK); Mo Zhou, Medina, WA (US); Apurv Pant, Bellevue, WA (US); Sally anne Kellaway, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/411,033

(22) Filed: Aug. 24, 2021

(51) Int. Cl.
| G06F 16/00 | (2019.01) |
| G06F 16/23 | (2019.01) |
| G06Q 30/0601 | (2023.01) |
| G06F 16/25 | (2019.01) |

(52) U.S. Cl.
CPC ........ *G06F 16/2379* (2019.01); *G06F 16/252* (2019.01); *G06Q 30/0631* (2013.01)

(58) Field of Classification Search
CPC ........................... G06F 16/24575; G06F 16/19
See application file for complete search history.

(56) References Cited

U.S. PATENT DOCUMENTS

| 10,671,942 | B1 | 6/2020 | Mcgovern et al. |
| 10,818,395 | B1 | 10/2020 | Khalak et al. |
| 11,256,703 | B1* | 2/2022 | Zhou .................. G06Q 30/0625 |
| 11,270,375 | B1* | 3/2022 | Jennings .............. G06Q 40/125 |
| 2011/0144986 | A1 | 6/2011 | Yu et al. |
| 2014/0297363 | A1 | 10/2014 | Vemana |
| 2019/0122135 | A1 | 4/2019 | Parker |
| 2019/0258942 | A1 | 8/2019 | Gu et al. |
| 2020/0334679 | A1 | 10/2020 | Sandepudi et al. |
| 2020/0394530 | A1 | 12/2020 | Tse et al. |
| 2021/0165901 | A1* | 6/2021 | Chandrashekhar ... G06F 21/552 |

OTHER PUBLICATIONS

"Amazon Personalize", Retrieved from: https://web.archive.org/web/20181128184650/https:/aws.amazon.com/personalize/, Nov. 28, 2018, 9 Pages.

"Recommendations AI", Retrieved from: https://web.archive.org/web/20190419050729/https:/cloud.google.com/recommendations/, Apr. 19, 2019, 7 Pages.

(Continued)

*Primary Examiner* — Cheryl Lewis

(57) ABSTRACT

The disclosure herein describes creating and managing an editable rules-based model. A model is trained to generate output values for data sources based on input feature data of the data sources. Using the trained model, results are generated that include feature-output value pairs and associated confidence values for each data source. The confidence values are aggregated for each feature-output value pair of the generated results, and rules of a rules-based model are built using the feature-output value pairs and the respective aggregated confidence values of the generated results. A user is provided access to the rules of the rules-based model via a model management interface. The rules-based model is updated based on rule change instructions received from the user via the model management interface.

20 Claims, 6 Drawing Sheets

(56) References Cited

OTHER PUBLICATIONS

"Recommender System", Retrieved from: https://developer.ibm.com/technologies/artificial-intelligence/models/max-recommender/, May 4, 2020, 7 Pages.

Peake, et al., "Explanation Mining: Post Hoc Interpretability of Latent Factor Models for Recommendation Systems", In Proceedings of the 24th ACM SIGKDD International Conference on Knowledge Discovery & Data Mining, Aug. 19, 2018, pp. 2060-2069.

Sokol, et al., "One Explanation Does Not Fit All", In Journal of Künstliche Intelligenz on Challenges in Interactive Machine Learning, vol. 34, Issue 2, Feb. 4, 2020, pp. 235-250.

Vojíř, et al., "Editable Machine Learning Models? A Rule-based Framework for User Studies of Explainability", In Journal of Advances in Data Analysis and Classification, vol. 14, Issue 4, Sep. 11, 2020, 11 Pages.

"International Search Report and Written Opinion Issued in PCT Application No. PCT/US22/037951", dated Nov. 17, 2022, 14 Pages.

\* cited by examiner

Rule-based Model Manager

| Feature | Feature value | Product | Confidence Level | |
|---|---|---|---|---|
| Age | 18-35 | Mouse | —○——— 78 | 🗏 |
| Customer type | Business account | Tablet Pen | —○——— 75 | 🗏 |
| Customer type | Customer account | Tablet Pen | —○——— 60 | 🗏 |
| Age | 36-50 | Mouse | —○——— 58 | 🗏 |
| Age | 36-50 | Tablet Book | —○——— 58 | 🗏 |
| Past purchase | Tablet pen | Tablet Mouse | —○——— 58 | 🗏 |
| Gender | Female | Tablet Mouse | —○——— 54 | 🗏 |

+ Add Rule

FIG. 4

EDITABLE RULES-BASED MODEL SYSTEM

BACKGROUND

Models trained using machine learning techniques, such as recommender systems based on Collaborative Filtering or Matrix Decomposition, offer high precision output, but they are not transparent. The decisions made by such models are based on latent vectors of input such as features of users and items inferred from past activities, and are difficult to understand and/or explain. Further, once trained, such models are difficult to edit without going through the training process again.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for creating and managing an editable rules-based model is described. A model is trained to generate an output value based on input feature data of a data source. Using the trained model, results are generated that include a feature-output value pairs and an associated confidence value for each data source of the plurality of data sources. The confidence values associated with the feature-output value pair for each data source of the plurality of data sources are aggregated and a rule of a rules-based model is built using the feature-output value pair and the aggregated confidence value. A user is provided access to the rule of the rules-based model via a model management interface. The rule of the rules-based model is updated based on rule change instructions received from the user via the model management interface. An output value is generated from the updated rule of the rules-based model based on input feature data of a data source.

BRIEF DESCRIPTION OF THE DRAWINGS

The present description will be better understood from the following detailed description read in light of the accompanying drawings, wherein:

FIG. 4 is a diagram illustrating a graphical user interface (GUI) displaying a model management interface;

Corresponding reference characters indicate corresponding parts throughout the drawings. In FIGS. 1 to 6, the systems are illustrated as schematic drawings. The drawings may not be to scale.

DETAILED DESCRIPTION

Figure 1:
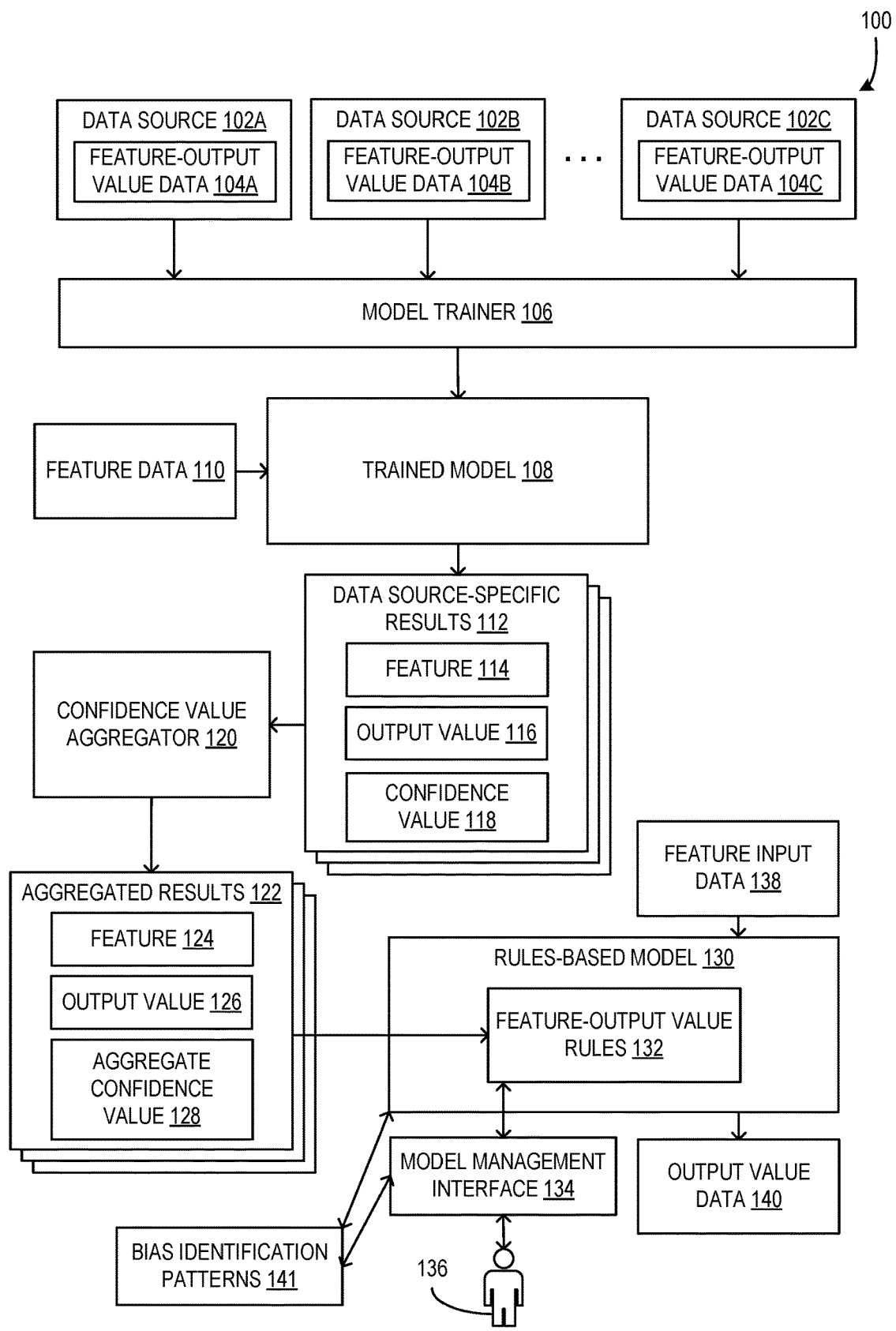
FIG. 1 is a block diagram illustrating an example system configured to generate a rules-based model and enabling users to change rules of the rules-based model.

Aspects of the disclosure provide a computerized method and system for creating and managing an editable rules-based model. A model is trained to generate output values for data sources based on input feature data of the data sources and the trained model is used to generate results. Each result includes a feature-output value pair and an associated confidence value. The confidence value indicates a degree of importance of a factor, as indicated by the feature of the pair, in predicting the output value of the pair. Further, each result is specific to the data source with which the features are associated. The confidence values are aggregated for each feature-output value pair of the generated results and rules of a rules-based model are built using the feature-output value pairs and the respective aggregated confidence values. The rules-based model is provided to a user via the model management interface. The model management interface enables the user to view and edit the rules of the rules-based model. The rules-based model is updated based on rule change instructions received from the user via the model management interface. An output value is generated from the updated rules-based model based on input feature data of a data source.

The disclosure operates in an unconventional manner at least by generating the aggregated confidence values from the data source-specific results of the trained model. The method of aggregating a confidence value for each feature-output value pair enables the rules-based model to mimic the performance of the trained model in a general manner, but the rules of the rules-based model are more transparent and understandable to users. Specifically, the disclosure describes the aggregation of the confidence values by combining the confidence values of all results that are associated with a particular feature-output value pair and dividing the combined result by the quantity of confidence values used in the combination. The resulting aggregated confidence value is an average confidence value of the feature-output value pair based on data from all of the data sources used to generate the results.

Further, the disclosure enables users to directly edit rules of the generated rules-based model via a model management interface. The interface enables users to adjust the confidence values of existing rules quickly and efficiently, as well as enabling them to create new rules and/or delete rules from the model. The changes made by a user via the interface are immediately reflected in the rules of the model with no additional training processes for the model required.

Additionally, the disclosure enables users to identify bias in the rules, and adjust the rules to remove the bias. Further, the disclosure enables users to define bias identification patterns that are applied to the rules of the rules-based model. Potentially biased rules that match the defined bias identification patterns result in a notification being displayed to a user of the interface that informs the user of the presence of the potentially biased rules. Further, the bias identification patterns may be defined such that rules that match them are automatically removed from the model and/or a different automatic action (e.g., without user input) is performed.

The disclosure provides an improvement in transparency of the functionality of a model when compared to trained models. Further, the resource and time costs of making changes to the described model are substantially lower than what is required to retrain a trained model. The quantity of hardware needed to manage the described rules-based model is reduced from the requirements of an equivalent trained model and the functionality and performance of the device upon which the disclosed system and/or model is implemented is improved.

FIG. 1 is a block diagram illustrating an example system 100 configured for generating a rules-based model 130 and enabling users 136 to change rules 132 of the rules-based model 130. In some examples, the system 100 uses a model trainer 106 and training data including feature-output value data 104A-C of respective data sources 102A-C to generate a trained model 108. The trained model 108 is provided feature data 110 to generate data source-specific results 112 that include features 114, output values 116 and associated confidence values 118. The data source-specific results 112 are provided to a confidence aggregator 120 to generate aggregated results 122 and those results 122 are used to generate the feature-output value rules 132 of the rules-based model 130. Once the rules-based model 130 is created, the model management interface 134 enables users 136 to change, create, and/or remove rules 132 from the rules-based model 130. Further, when the rules-based model 130 is provided feature input data 138, the rules-based model 130 uses the rules 132 to generate output value data 140 as described herein.

In some examples, the system 100 is stored and/or otherwise located on a computing device. Alternatively, the system 100 is stored and/or otherwise located on multiple computing devices that are configured to communicate (e.g., via a computer network). For instance, in an example, the model trainer 106, trained model 108, and confidence value aggregator 120 are located on a first computing device and any rules-based models 130 that have been created using those components are located on other computing devices of the system 100 or other computing devices that are outside the system 100 (e.g., a rules-based model 130 created for use by a customer is provided to the customer for storage in the customer's own system). In other examples, other arrangements or organizations of the system 100 across one or more computer systems are used without departing from the description.

Further, in some examples, operations of the system 100 are executed and/or otherwise performed on a computing device. Alternatively, operations of the system 100 are executed and/or otherwise performed on multiple computing devices that are configured to communicate (e.g., via a computer network). For instance, in an example, training the trained model 108 is performed on a first computing device and the generation of the aggregated results 122 and the corresponding rules-based model 130 are performed on a second computing device. In other examples, other distribution or organization of operations of the system 100 across one or more computer systems are used without departing from the description.

The system 100 is configured to collect and/or receive feature-output value data 104A-C from multiple data sources 102A-C. In some examples, the data sources 102A-C include consumers who have made purchase transactions from an entity (e.g., a merchant for whom the rules-based model 130 is created). The consumers are associated with feature-output value data 104 (e.g., in the form of transaction data), that has been collected and reflects attributes and/or behavior of the consumers. For instance, in an example, the feature-output value data 104A of the consumer data source 102A includes features of the consumer that describe attributes of the consumer (e.g., the consumer's age, the consumer's gender, the consumer's location, an account type of the consumer, and/or the consumer's ethnicity) and/or features of the consumer that describe behavior of the consumer (e.g., past purchases made by the consumer from the merchant, past activity by the consumer on the merchant's website, and/or methods by which the consumer arrives at the merchant's website). These features are linked to output values associated with the consumer's behavior (e.g., output values that indicate items the consumer purchased). For instance, the features of the consumer at the point an item is purchased are linked to that purchased item as an output value.

In some examples, the feature-output value data 104A-C are provided to the model trainer 106 from a plurality of data sources 102A-C. The model trainer 106 is configured to create and train the trained model 108 based on the provided feature-output value data 104A-C such that the trained model 108, when provided feature data of a particular consumer or other data source, generates one or more predicted or recommended output values (e.g., items to be recommended to the consumer that the consumer is most likely to purchase). Additionally, or alternatively, the trained model 108 is a recommendation model trained based on Collaborative Filtering and/or Matrix Decomposition.

In some examples, the model trainer 106 is configured to train the model 108 using machine learning techniques. The training of the trained model 108 includes machine learning techniques that use, for instance, a trained regressor such as a random decision forest, a directed acyclic graph, a support vector machine, a convolutional neural network, or other neural network, or another trained regressor. Additionally, or alternatively, the training of the trained model 108 makes use of training data including the features and associated output values of the feature-output value data 104A-C as training data pairs when applying machine learning techniques and/or algorithms. Millions of training data pairs may be stored in a machine learning data structure (e.g., of the system 100) for use in training the trained model 108.

Further, once the trained model 108 is trained, it is configured to generate output including output value data when provided feature data. In some examples, the trained model 108 is configured to receive feature data 110 and, in response, to generate data source-specific results 112. Each data source-specific result 112 is associated with a particular data source and includes a feature 114 associated with the data source (e.g., data sources 102A-C), an output value 116 that is recommended or otherwise predicted based on the provided feature data 110, and a confidence value 118 indicating a degree to which the feature 114 influenced the determination of the output value 116. Additionally, or alternatively, each data source-specific result 112 includes a unique or pseudo-unique identifier of the data source with which the result 112 is associated. For instance, in an example, a consumer's feature data 110 is provided to the trained model 108, including a feature of the consumer's age of 25 years old. The trained model 108 generates a data source-specific result 112 that includes the feature 114 of the consumers age of 25 and an output value 116 that is indicative of a particular computer mouse item, predicting that the consumer is likely to purchase that item. The result 112 further includes a confidence value 118 that indicates the degree to which the consumer's age of 25 influenced the determination of the computer mouse item as the output value 116. Further, the trained model 108 is configured to generate a result 112 for each pair of a feature 114 of the consumer and each predicted output value 116. For example, if the feature data 110 includes ten features 114 of the consumer and results in five predicted output values 116, the total quantity of data source-specific results 112 generated by the trained model 108 is 50, such that a confidence value 118 is determined for each pair of a feature 114 and an output value 116. In some examples, output values 116 include at least one of: items a consumer is predicted to purchase, actions to be recommended to a consumer, movies or other media to be recommended to a consumer, or the like.

Additionally, or alternatively, more, fewer, or different types of output values may be used as output values 116 without departing from the description.

In some examples, the system 100 is configured to generate a set of data source-specific results 112 using feature data 110 from a variety of different data sources (e.g., data sources 102A-C and/or other data sources). To do so, feature data 110 of each data source is provided as input to the trained model 108 and data source-specific results 112 are generated as described herein. In many instances, the set of results 112 generated in such a way include results 112 associated with different data sources that have the same pairs of features 114 and output values 116. Such results 112 with matching pairs have either the same confidence value 118 or different confidence values 118, depending on the determination of the trained model 108. In some examples, the features of most data sources used to generate results 112 include different feature values (e.g., two consumers have different age values of 25 and 50) and/or different types or sets of features (e.g., features of a first consumer include six different features and features of a second consumer include nine different features, only four of which overlap with the types of features of the first consumer). In such examples, different sets of features between data sources often results in different confidence values 118 being determined for the same feature-output value pairs. The generation of data source-specific results 112 is described in greater detail below with respect to FIG. 2.

The confidence value aggregator 120 includes hardware, firmware, and/or software configured to aggregate or otherwise combine the confidence values 118 of results 112 that share a feature-output value pair to create aggregate results 122 with aggregate confidence values 128. In some examples, the confidence value aggregator 120 is configured to identify sets of results 112 that have matching feature-output value pairs by matching output values 116 of results 112 to create a subset of results 112 and then, of that subset of results 112, results 112 with matching features 114 are identified. In some examples, output values 116 are unique or pseudo-unique values that identify specific items and, as a result, matching output values 116 includes comparing the values 116 of results 112 to each other. Similarly, some features 114 include specific values, codes, or identifiers (e.g., a past-purchased item identifier, a code indicative of a consumer's gender, or the like) that can be compared between results 112 when identifying matching features 114.

Additionally, or alternatively, in some examples, features 114 include feature values that are combined into ranges, such as consumer age values that are combined into ranges of ages to reduce the granularity to a practical level, rather than having age groups for each individual age value. In such examples, results 112 with the age feature 114 are matched with other results 112 that share a defined age range (e.g., a result 112 with an age feature value of 25 is matched with a result 112 with an age feature value of 26 when the defined age range is 25-30). In other examples, other methods of identifying results 112 with matching feature-output value pairs are used without departing from the description.

After a subset of results 112 with matching feature-output value pairs is identified, the confidence values 118 of that subset of results 112 are aggregated to form an aggregate confidence value 128 of an aggregated result 122. In some examples, such aggregation includes averaging the confidence values 118 based on the quantity of results 112 in the subset, but in other examples, other methods of aggregating the confidence values 118 are used without departing from the description. An example confidence value aggregation process is described in greater detail below with respect to FIG. 3.

In some examples, for each subset of results 112 with matching feature-output value pairs, an aggregated result 122 is generated. Each aggregated result 122 includes a feature 124, an output value 126, and an aggregate confidence value 128 that has been determined as described herein. Further, in some examples, the feature 124 of an aggregated result 122 matches the features 114 of the corresponding subset of results 112 from which the aggregated result 122 was generated. Additionally, or alternatively, the feature 124 of the aggregated result 122 includes a value range based on a value range used to match the features 114 of the corresponding subset of results 122, as described above with respect to defined age ranges. Similarly, the output value 126 of the aggregated result 122 matches the output values 116 of the corresponding subset of results 112 and/or the output value 126 includes a range or group of output values based on the output values 116 used to match the results 112 of the corresponding subset.

The aggregated results 122 are used by the system to generate, produce, or otherwise create the rules-based model 130 including the feature-output value rules 132. In some examples, each rule 132 is created directly from an aggregated result 122, such that the feature 124 of the result 122 is used as a condition for the rule 132 to be applied, the output value 126 is used as the result of the rule 132 being applied, and the aggregate confidence value 128 is used as a weight factor of that result. Thus, most or all feature-output value pairs represented in the aggregated results 122 are converted or otherwise transformed into feature-output value rules 132 for use in the rules-based model 130. However, in other examples, other methods of generating feature-output value rules 132 from the aggregated results 122 are used without departing from the description.

The rules-based model 130 includes the set of feature-output value rules 132 that can be observed such that the rules-based model 130 is a "white box" model, in contrast to the "black box" trained model 108. As a result, in some examples, the system 100 is configured to provide users 136 with a model management interface 134 that enables the users 136 to view rules 132 of the model 130 and to edit the rules 132, including creating new rules 132 (e.g., defining a feature condition to trigger the new rule, defining an output value to be the result of the new rule, and defining a confidence value to be the weight factor of the result of the new rule), changing existing rules 132 (e.g., increasing or decreasing the confidence weight factor of the rule to increase or decrease its relevance when the model 130 makes predictions or recommendations), and deleting or otherwise removing rules 132 from relevance (e.g., setting the confidence weight factor of a rule to zero or removing it entirely from the set of rules). The model management interface 134 and associated operations are described in greater detail below with respect to FIG. 4.

The rules-based model 130 is configured to receive feature input data 138 and, based on applying the feature-output value rules 132 to that feature input data 138, to generate output value data 140. In some examples, the rules-based model 130 is configured to generate recommendations of items for purchase based on feature input data 138 including features of a consumer as described herein. For instance, the rules-based model 130 is used by an online merchant to determine recommended items that a consumer is likely to purchase based on the consumer feature data known by the online merchant. The rules-based model 130 evaluates each feature-output value rule 132 that is applicable and/or relevant to the feature input data 138 (e.g., if the feature input data 138 includes an age value, each rule 132 that includes an age value condition is evaluated with respect to that age value). The evaluation of each rule 132 results in a set of output value results (e.g., potential recommended items) from at least a portion of the rules 132 and each of those output value results is associated with a confidence weight factor as described herein.

In some examples, if the set of output value results includes multiple instances of an output value result and associated confidence weight factors, the rules-based model 130 is configured to combine those confidence weight factors to obtain a total weight factor associated with the output value result. For instance, in an example, the set of output value results includes three instances of a laptop computer associated with three different weight factors of 0.2, 0.4, and 0.5. Those weight factors are combined to obtain a total weight factor of 1.1. While, in this example, the multiple weight factors a summed to obtain the total weight factor, in other examples, other methods of combining weight factors into a total weight factors are used without departing from the description.

The rules-based model 130 is configured to provide the output value results and associated total weight factors as output value data 140. In some examples, the output value results are ordered in the output value data 140 based on the associated total weight factors, such that the output value result with the highest total weight factor is first, the output value result with the second highest total weight factors is second, and so on. For instance, in an example, the recommended item with the highest total weight factor is provided in the output value data 140 as the first recommended item in a list of recommended items with progressively lower total weight factors.

Additionally, or alternatively, in some examples, the rules-based model 130 is configured to provide a subset of the output value results in the output value data 140. For instance, a threshold is defined such that the three, five, or another value of output value results with the highest total weight factors are provided in the output value data 140. Additionally, or alternatively, a weight factor threshold is defined such that output value results with total weight factors that exceed the weight factor threshold are included in the output value data 140.

Further, in some examples, the system 100 is configured to provide information about rules that are potentially biased toward consumers or other users in the feature-output value rules 132. Some users 136 want to adjust or change the set of rules 132 in a model 130 to adjust or eliminate rules that result in output value data 140 that reflects undesirable and/or inappropriate bias toward a consumer with whom the feature input data 138 is associated. For instance, a consumer's age, gender, or race data being used as feature input data 138 and being evaluated with respect to the feature-output value rules 132 results in biased output value data 140 in some cases. Because the model management interface 134 is configured to enable users 136 to change or even remove rules from the feature-output value rules 132, the system 100 further enables users 136 to address any rules 132 that they view as biased using the model management interface 134.

Additionally, or alternatively, in some examples, the system 100 is configured to automatically identify potentially biased rules in the feature-output value rules 132 and to bring those potentially biased rules to the attention of a user 136. For the system 100 to identify potentially biased rules, the system 100 is configured to receive and maintain a set of bias identification patterns 141. The bias identification patterns 141 are configured to be compared to the feature-output value rules 132 of the model 130. If a rule 132 matches a pattern 141, the system 100 is configured to provide a notification of the potentially biased rule to a user 136 of the model management interface 134.

In some examples, bias identification patterns 141 are created, edited, and/or deleted by a user 136 of the model management interface 134. Patterns 141 are created to match one or more of the data values of a feature-output value rule 132, such as a feature type, a specific feature value or value range, and/or an output value of a rule 132. For instance, in an example, a bias identification pattern 141 is defined that matches feature-output value rules 132 that have a feature type of age. After the rule is defined, when the feature-output value rules 132 of the model 130 include age-based rules, the user 136 receives a notification on the interface 134 that indicates that there are potentially biased rules in the rules 132. Additionally, or alternatively, the notification indicates the specific rules that are potentially biased and enables the user 136 to interact with them to either adjust the rules or remove the rules. Further, in some examples, if the user 136 decides that the highlighted rules are not biased, the user 136 confirms the rules or otherwise allows them to remain in the model 130.

Figure 2:
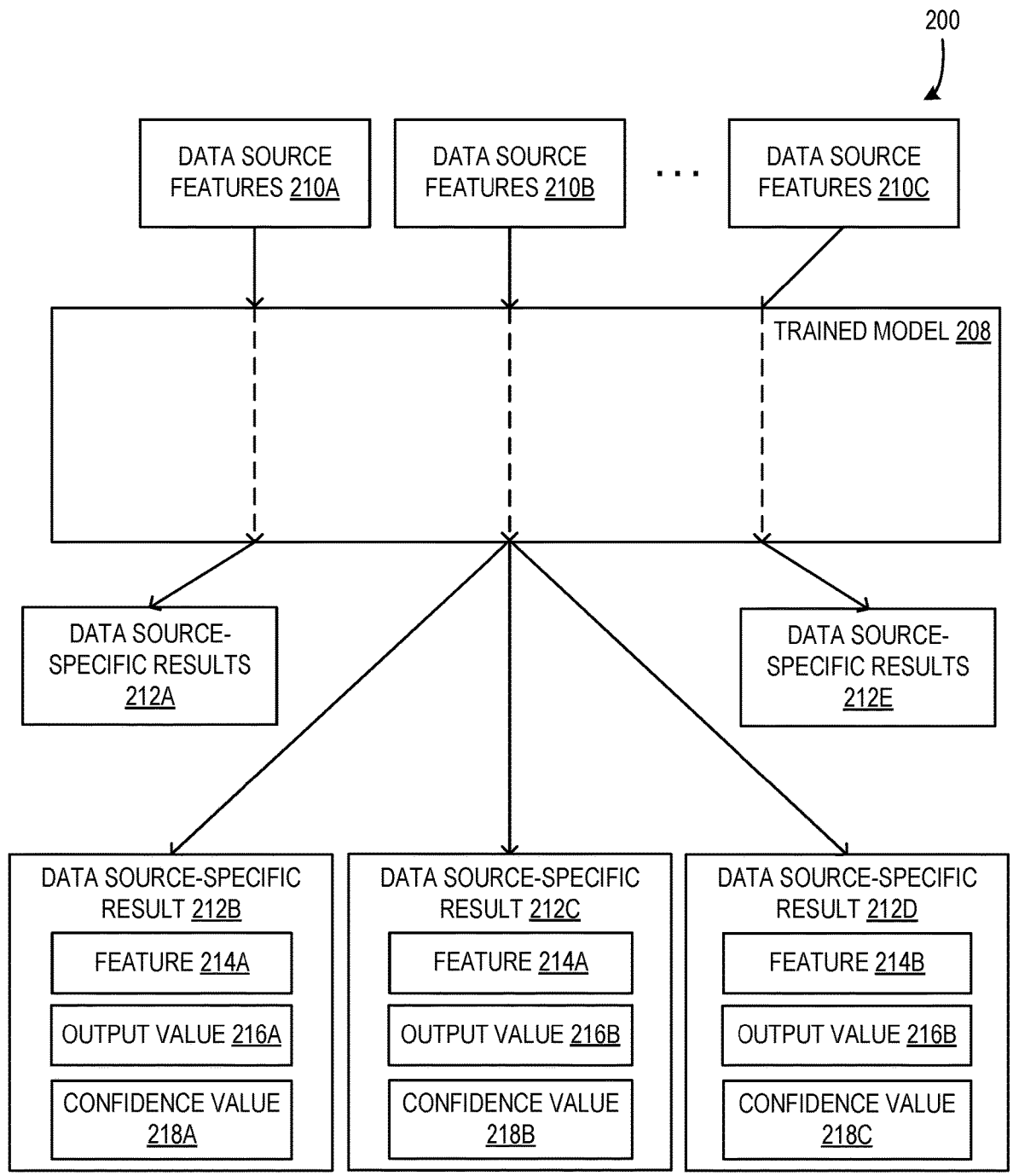
FIG. 2 is a block diagram illustrating a system configured to generate data source-specific results based on data source features of a plurality of data sources.

FIG. 2 is a block diagram illustrating a system 200 configured for generating data source-specific results 212A-E based on data source features 210A-C of a plurality of data sources (e.g., data sources 102A-C). In some examples, the system 200 is part of a system such as system 100 of FIG. 1 as described herein. The system 200 includes a trained model 208 that generates data source-specific results 212A-E based on data source features 210A-C provided to the trained model 208 as input.

In some examples, the set of data source features 210A-C come from different data sources, such that data source features 210A are the features of a first data source, data source features 210B are the features of a second data source, data source features 210C are the features of a third data source, and so on. Additionally, or alternatively, in some examples, the trained model 208 is provided more, fewer, or different data source features 210A-C without departing from the description.

The trained model 208 is configured to generate data source specific results 212A based on the data source features 210A, data source-specific results 212B-D based on the data source features 210B, and data source-specific results 212E based on the data source features 210C. In some examples, data source-specific results 212A and 212E include multiple different data source-specific results as illustrated with respect to data source-specific results 212B-D and that data source-specific results 212B-D serve as an example of multiple results 212 generated based on a set of data source features 210B.

In some examples, the data source-specific results generated from the data source features 210B include data source-specific results 212B, 212C, and 212D. The result 212B includes a feature 214A, an output value 216A, and a confidence value 218A. The data in the result 212B indicates that the trained model 208 determines or predicts the output value 216A as a response to the feature 21A with a confidence of confidence value 218A, as described herein.

Similarly, the data in result 212C includes the feature 214A, an output value 216B, and a confidence value 218B. Thus, result 212C indicates that the feature 214A is also predictive of the output value 216B with a confidence of confidence value 218B. In the illustrated example, the feature 214A is predictive or indicative of two different output values confidence values.

Additionally, the data in result 212D includes a feature 214B, the output value 216B, and a confidence value 218C. This indicates that, like the feature 214A, the feature 214B is also predictive or indicative of the output value 216B, but at a confidence value 218C. The output value 216B is the predicted or recommended output for at least two different features 214A and 214B at different confidence values 218B and 218C.

In other examples, the data source-specific results 212A-E generated by the trained model 208 include more, fewer, or different results without departing from the description. Further, in many examples, the quantity of results generated is larger than illustrated due to the multiplicative nature of the process (e.g., a data source with twenty features that is associated with six different output values results in 120 different data source-specific results).

Figure 3:
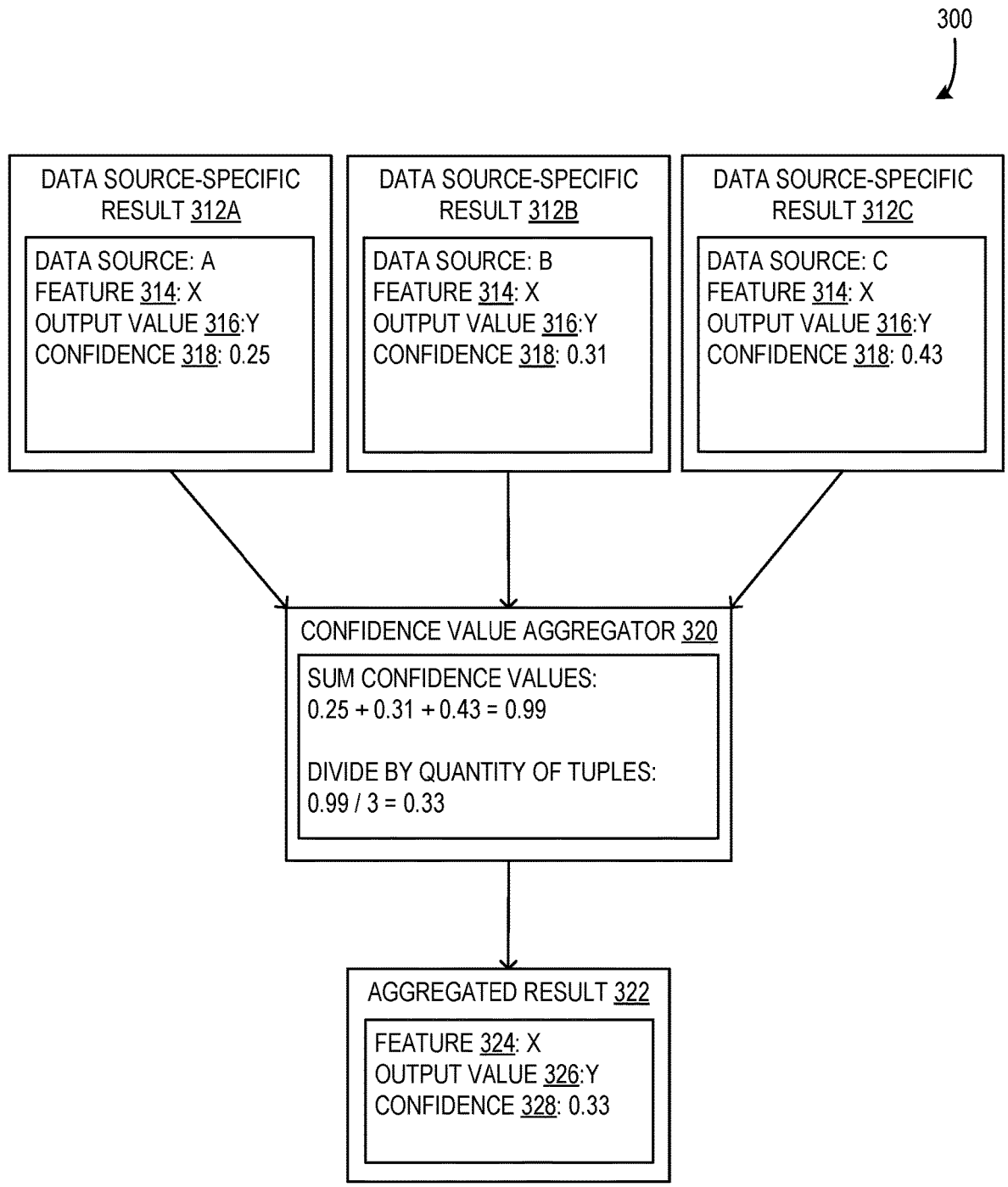
FIG. 3 is a block diagram illustrating a system configured to generate an aggregated result from a set of data source-specific results.

FIG. 3 is a block diagram illustrating a system 300 configured for generating an aggregated result 322 from a set of data source-specific results 312A-C. In some examples, the system 300 is part of a system such as system 100 of FIG. 1 as described herein. The system 300 includes a confidence value aggregator 320 that is configured to generate or otherwise create the aggregated result 322 from the data source-specific results 312A-C.

In some examples, the set of data source-specific results 312A-C are a subset of results that are "matching", meaning that the features and outputs of the results 312A-C match each other. As illustrated, each of the results 312A, 312B, and 312C include a feature 314 of 'X' and an output value 316 of 'Y'. In some examples, a feature of 'X' includes a feature type and a feature value (e.g., a feature type of 'age' and a feature value of '21-35') or other combination of multiple data values. This matching indicates that the features and/or output values of the results 312A-C are the same values (e.g., output values that are a code for a specific item for sale) or that they fall within a shared range of values (e.g., feature values that are age values that fall within a defined age range).

Further, in some examples, the data source-specific results 312A-C are each associated with a data source and as illustrated, the data sources of the results 312A-C differ from each other. Each data source has a set of features that influences the confidence values generated by the trained model, such that the confidence value 318 generated for a feature-output value pair of a first data source is often different from the confidence value 318 generated for the same feature-output value pair of a second data source. As illustrated, the confidence value 318 of result 312A is 0.25, the confidence value 318 of the result 312B is 0.31, and the confidence value 318 of the result 312C is 0.43.

To enable the creation of a common or single rule based on the feature-output value pair, the different confidence values are aggregated into an aggregated result 322 by the confidence value aggregator 320. In some examples, the confidence value aggregator 320 receives or obtains the set of "matching" results 312A-C associated with a feature-output value pair and calculates an aggregated confidence value 328 from the confidence values 318 of the results 312A-C. To aggregate the confidence values as illustrated, the confidence value aggregator 320 sums or adds the confidence values together (e.g., 0.25+0.31+0.43=0.99) and then divides the result by the quantity of results (e.g., 0.99/3=0.33). The aggregated result 322 is the created with the feature 324 of 'X', the output value 326 of 'Y', and the new aggregated confidence value 328 of 0.33. Alternatively, if a fourth matching result was included in the results 312A-C and the total combined confidence value is still 0.99, that value is divided by 4 instead of 3, yielding an aggregated confidence value of 0.2475.

In other examples, other methods of aggregating confidence values of the results 312A-C are used without departing from the description. Additionally, or alternatively, the set of results used to generate the aggregated result 322 includes more, fewer, or different data source-specific results without departing from the description.

FIG. 4 is a diagram illustrating a GUI 400 displaying a model management interface (e.g., model management interface 134). In some examples, the GUI 400 is displayed to a user (e.g., user 136) as part of a system such as system 100 of FIG. 1. The GUI 400 includes a grid with rows for each rule (e.g., feature-output value rules 132) with columns that provide information about the rules. In the first column 402, the feature with which the rule is associated is indicated (e.g., age, customer type, past purchases, or gender) and, in the second column 404, a value or value range of the feature is provided. The value or value range indicates the feature values to which the rule is applied. For instance, in the first row, the feature is 'Age', and the feature value range is '18-35', indicating that the rule is applied to consumers with an age value in the range of 18-35.

The third column 406 is a 'Product' column, which indicates a specific kind of output value. The products listed in the 'Product' column are the output values that are predicted or recommended based on the associated feature value in the same row. As illustrated, the products include a mouse, a tablet pen, a tablet book, and a tablet mouse.

The fourth column 408 is a 'Confidence Level' column. The column 408 displays a value that is the confidence value of the rule with which the row is associated. Further, the column 408 includes a slider component that indicates current confidence value with respect to a potential range of possible confidence values. In some examples, the range is defined from zero to 100 but, in other examples, other value ranges are used.

At the end of each row, there is an icon 410 in the form of a garbage can. In some examples, when clicked or otherwise activated, the icon 410 is configured to delete or remove the rule associated with the row from the rules-based model. Additionally, or alternatively, activating the icon 410 causes a dialog box to be displayed that asks the user to confirm that they want to remove the rule from the model. In other examples, other steps or processes are included when removing a rule from the model without departing from the description.

In some examples, the GUI 400 further enables a user to create or adjust a displayed rule. The 'Add Rule' button 412, upon activation, is configured to enable a user to create a new rule to be included in the rules-based model. For instance, activating the button 412 causes a blank row to be added to the table displayed in the GUI and enables the user to fill in the feature, the feature value, the product, and the confidence level. Additionally, or alternatively, activating the button 412 causes an additional add rule dialog box or other GUI to be displayed that is configured to guide the user to create the rule. For instance, in an example, the additional dialog box prompts the user to identify a feature of the new rule from a list of available features and/or enables the user to create a new feature. Further, the exemplary additional dialog box enables the user to select or set a feature value of the new rule, a product of the new rule, and a confidence level of the new rule. Additionally, or alternatively, the exemplary additional dialog box enables the user to review existing rules of model that share feature, feature value, and/or product with the new rule, enabling the user to avoid creating repetitive or overlapping rules.

Further, in some examples, the GUI 400 is configured to enable a user to adjust or change a rule that is displayed. For instance, the slider of the confidence level column 408 is configured to enable a user to move the slider to adjust the confidence level of the rule (e.g., sliding the circle to the left reduces the confidence level and sliding the circle to the right increases the confidence level). Additionally, or alternatively, the GUI 400 is configured to enable a user to change the feature, feature value, and/or product of a rule by interacting with those values in the displayed table (e.g., via changing values using dropdown menus, changing values in editable fields, or the like). Further, in some examples, the GUI 400 enables a user to activate a rule change dialog box similar to the add rule dialog box described above.

Further, in some examples, new rules, removed rules, and/or changes to rules cause the feature-output value rules (e.g., rules 132) of the rules-based model (e.g., model 130) to be updated or otherwise changed within the model. After changes have been made to the model, the changed ruleset is used to evaluate feature input data and generate output value data going forward.

Additionally, or alternatively, in some examples, the GUI 400 enables a user to search for rules in the model based on feature type, feature value, output value, confidence value, and/or some combination thereof. The GUI 400 is configured to display a filtered list of rules based on the search data provided by the user. For instance, if the user provides a search data indicating a feature type of 'age', the GUI 400 is configured to display a filtered list of rules that use the 'age' feature type and other rules are not displayed. In some examples, searching is specifically directed at feature type, feature value, output value, and/or confidence value, and/or searching includes a keyword search that searches all data of a rule for a searched keyword. In other examples, other types of searching are enabled by the GUI 400 without departing from the description.

In other examples, the GUI 400 includes more, fewer, or different components without departing from the description. Further, the GUI 400 is configured to enable the user to view rules, add rules, change rules, and/or remove rules of the rules-based model using more, fewer, or different interactions with the GUI 400 without departing from the description.

Figure 5:
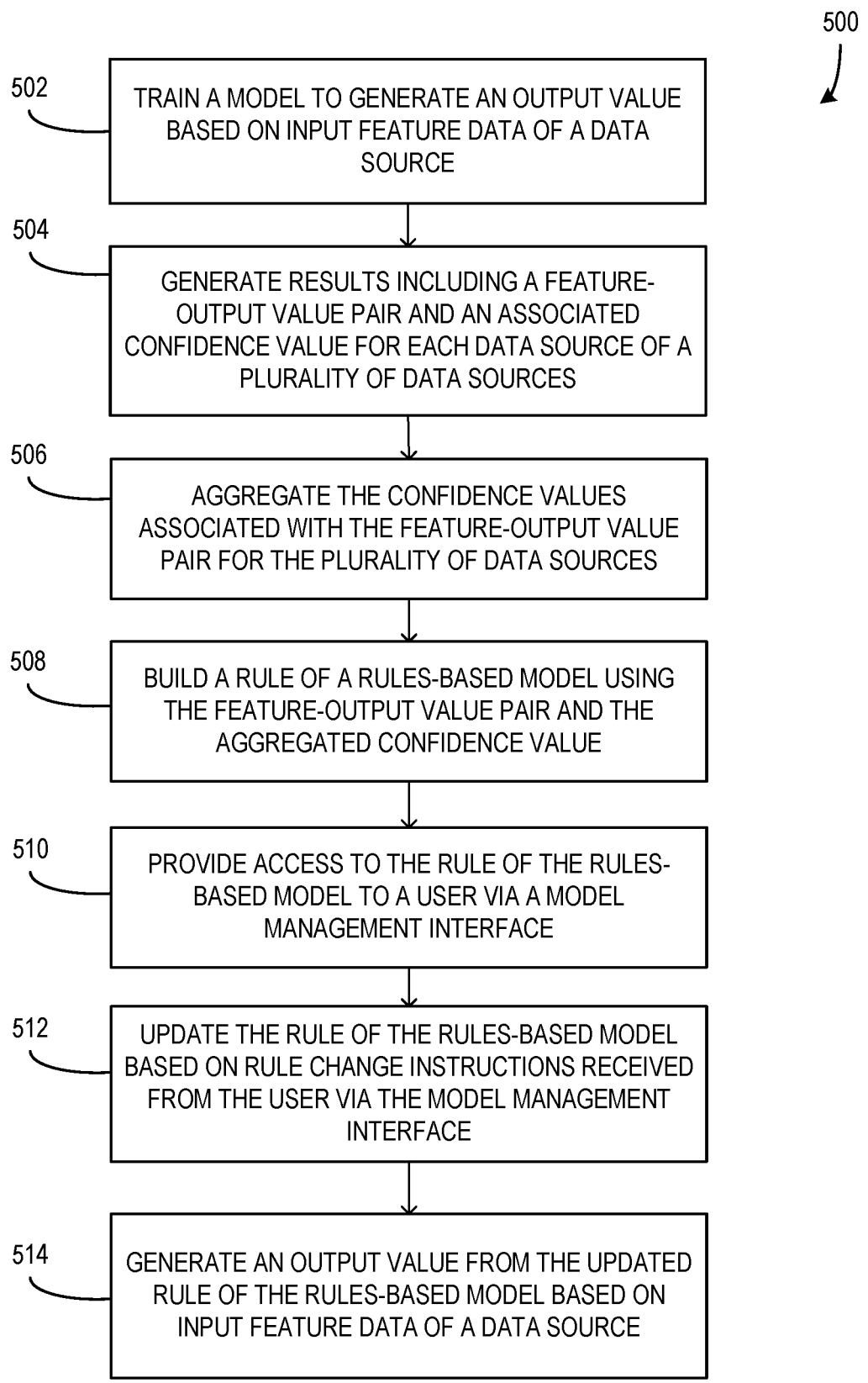
FIG. 5 is a flowchart illustrating a computerized method for creating and managing an editable rules-based model.

FIG. 5 is a flowchart illustrating a computerized method 500 for creating and managing an editable rules-based model (e.g., rules-based model 130). In some examples, the computerized method 500 is executed or otherwise performed in a system such as system 100 of FIG. 1. At 502, a model (e.g., a trained model 108) is trained to generate an output value (e.g., output values 116) for a data source (e.g., data sources 102A-C) based on input feature data (e.g., feature data 110) of the data source. In some examples, the data sources are consumers, customers, or other users, and the feature data includes features that describe those users (e.g., age, gender, race, ethnicity, location) and/or their behavior (e.g., past websites visited, purchase history data, dates and/or times associated with user behavior).

Additionally, the training of the model is based on machine learning techniques and the training data used includes feature data of data sources and output values associated with the feature data. For instance, in an example, a consumer's feature data is linked to the items the consumer bought and those pairs of features to purchased items are used as training data for the model.

At 504, using the trained model, results are generated that include feature-output value pairs and associated confidence values. The results are generated for each data source of the plurality of data sources, such that each data source has set of results with which it is associated. As described herein, in some examples, the set of results for a data source includes a result for each possible feature-output value pair, such that if a data source has 20 features and five associated output values, the set of results for the data source includes 100 results.

At 506, the confidence values for each feature-output value pair of the generated results are aggregated. In some examples, the aggregating includes collecting or grouping results that have matching feature-output value pairs as described herein. The confidence values of the grouped results are combined into a total confidence value and that total confidence value divided by the quantity of results in the grouped results. This yields an aggregated confidence value that is associated with the feature-output value pair.

At 508, rules of a rules-based model are built using the feature-output value pairs and their respective aggregated confidence values. As a result, there is one rule for each feature-output value pair. In some examples, a rule built from a feature-output value pair and a confidence value includes the feature from the pair as a trigger for the rule (e.g., if feature data includes an age value between 18 and 35, trigger the rule). The output value of the pair and the associated confidence value represent the effect of the rule being triggered, such that the output value becomes a potential output of the model with a weight factor of the confidence value, as described herein.

At 510, access to the rules of the rules-based model is provided to a user via a model management interface. In some examples, the model management interface displays the rules of the model to the user and/or enables the user to create rules, change rules, or delete rules from the model. Additionally, interactions by the user with the model management interface causes rule change instructions to be received by the system.

Additionally, or alternatively, in some examples, providing access to the rules via the model management interface further includes displaying the rules and including editable interface components (e.g., the slider components in column 408 of FIG. 4) associated with the confidence values of the rules. A user of the interface is enabled to change confidence values of the displayed rules by interacting with the editable interface components, wherein rule change instructions are received from the model management interface based on interactions with the editable interface components.

Further, as described above, in some examples, the model management interface enables users to define bias identification patterns that are used to identify potentially biased rules in the rules-based model. Such patterns are configured to identify potentially biased rules based on feature types, feature values or value ranges, output values, or a combination thereof. Additionally, or alternatively, the model management interface is configured to display or otherwise provide notification of potentially biased rules that are identified and/or detected by the system as described herein, such that a user of the interface can address the potentially biased rules.

At 512, the rules-based model is updated based on rule change instructions received from the user via the model management interface. Changes made by the user via the interface, such as creating a new rule, adjusting a confidence level of an existing rule, changing a feature value range of a rule, or removing a rule from the model, are reflected in the rule change instructions which are used to change the data in the model. After rules of the rules-based model are changed based on the rule change instructions, the updated set of rules reflects the changes made by the user on the model management interface. Because the rules-based model is made up of a plurality of rules and those rules are directly viewable by the user, the user is enabled to efficiently and accurately adjust the model.

At 514, an output value is generated from the updated rules-based model based on input feature data of a data source. In some examples, input feature data that is descriptive of a data source, such as a consumer or other user, and/or behavior of the data source is provided as input to the rules-based model. The rules of the model are applied to the input feature data and based on that application, a set of output values and associated confidence values are generated. An output value with a highest confidence value is selected from the set of output values and associated confidence values and that selected output value is provided in response to the input feature data. Additionally, or alternatively, multiple output values are provided in response to the input feature data and associated confidence values are also provided as a measure of a likely relevance or accuracy of each output value.

Additionally, in some examples, the updated rules-based model is used to generate a plurality of output values. Then, the model is updated based on some new rule change instructions. The new version of the model is then used to generate more output values.

Additionally, or alternatively, it should be understood that the rules-based model may be used to generate output values based on input feature data prior to it being updated based on rule change instructions without departing from the description.

Additional Examples

In an example, an online merchant provides a set of training data including data associated with a plurality of customers that have purchased items from the merchant's website. The training data includes purchase history data as well as some descriptive data of the customers, such as age, gender, race, and location. The merchant provides the training data for use in a system (e.g., system 100 of FIG. 1). The system is configured to train a model using the merchant's training data and then to create a rules-based model from the trained model that the merchant can use to make recommendations of items to customers on their website.

The system trains a model based on the training data. The trained model is then provided customer feature data and the training model produces a set of customer-specific results that include feature-output value pairs and associated confidence values. The output values of the results include items that the customers are likely to purchase (e.g., recommendations that can be made to customers).

The system then aggregates the customer-specific results into aggregated results such that, for each feature-output value pair, an aggregated confidence value is generated. Those aggregated confidence values are used with the corresponding feature-output value pairs to create a rules-based model with a set of feature-output value rules as described herein.

The system then provides the merchant access to the rules-based model via a model management interface. The rules of the model are displayed to the merchant and the merchant is enabled to interact with the rules to scroll through the quantity of rules or to view the rules across multiple pages. The model includes hundreds of rules based on the quantity of different feature-output value pairs that were generated by the trained model.

As the merchant views the rules of the model, they notice that, in some cases, a customer's gender and/or race has significant relevance to the recommendations that are made. The merchant realizes that such bias to the recommendations may be sensitive or unacceptable to customers. To address the biased rules of the model, the merchant uses the search field of the interface to search for all rules that are based on gender. The interface displays a filtered listing of all rules that are based on gender to the merchant. The merchant is then enabled to remove those rules from the model. In some examples, the interface enables the merchant to select all the rules in the filtered listing and to remove them all at once. The merchant then does the same for rules that are based on race.

In a related example, the merchant realizes that age-based recommendations may also be sensitive. The merchant accesses the interface to create a bias identification pattern to apply to the model. The merchant creates a pattern that identifies rules in the model associated with a feature type of 'age'. Once the pattern is created, the system automatically searches the rules of the model for rules with the feature type of 'age'. The system identifies several rules that are based on age and displays a notification to the merchant that potentially biased rules are present in the model. The notification further causes the identified potentially biased rules to be displayed as a filtered listing in the interface. The merchant reviews the listed rules and decides to remove all of the listed age-based rules from the model.

Further, in an example, the merchant then uses the rules-based model that they edited to generate recommended items, as described herein, for customers on their website.

Exemplary Operating Environment

Figure 6:
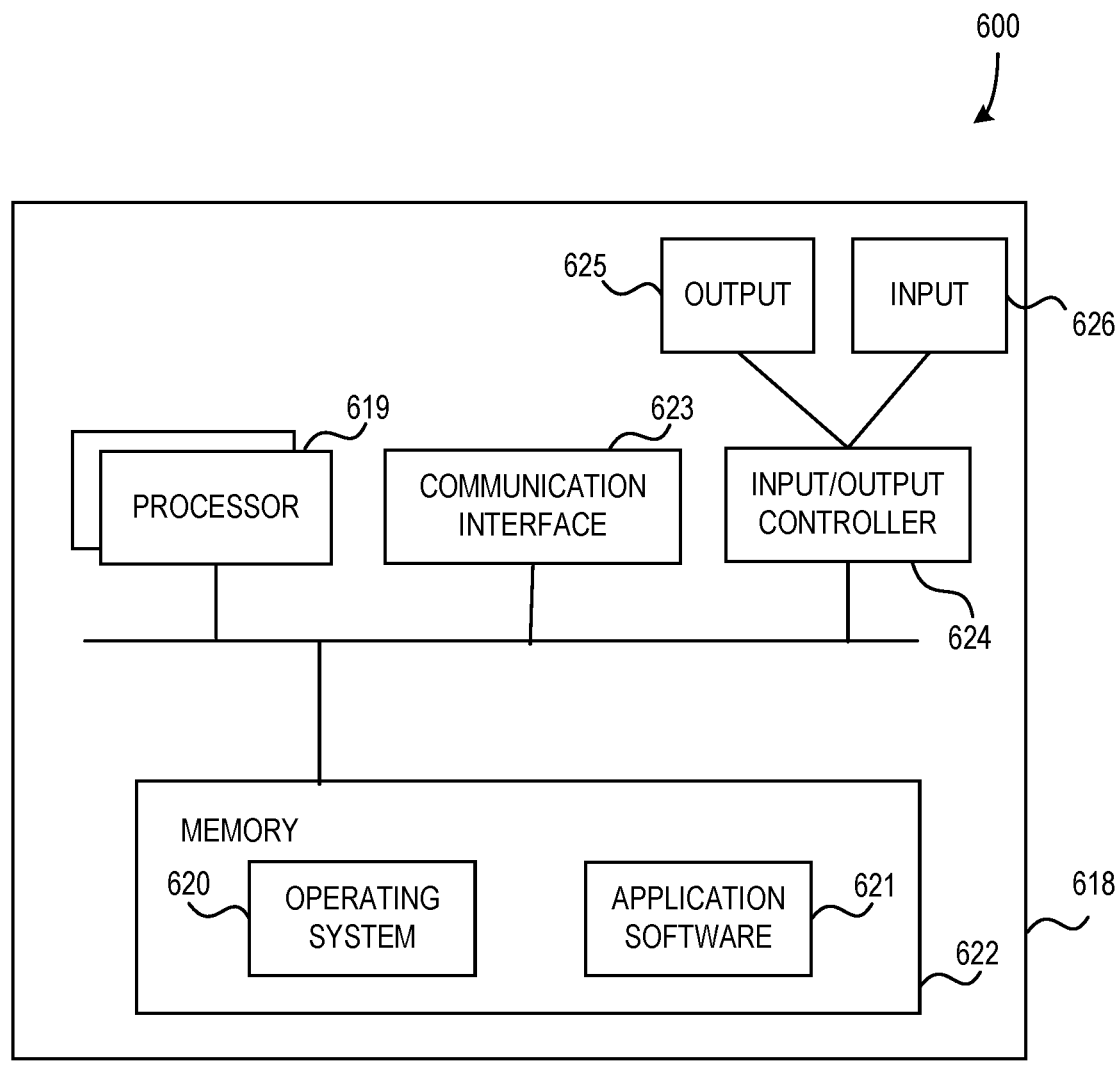
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, generating a rules-based model based on output of a trained model and enabling users to change rules of the rules-based model as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for creating and managing an editable rules-based model comprises: at least one processor; and at least one memory comprising computer program code, the at least one memory and the computer program code configured to, with the at least one processor, cause the at least one processor to: train a model to generate an output value based on input feature data of a data source; generate, using the trained model, results including a feature-output value pair and an associated confidence value for each data source of a plurality of data sources; aggregate the confidence values associated with the feature-output value pair for each data source of the plurality of data sources to form an aggregated confidence value of the feature-output value pair; build a rule of a rules-based model using the feature-output value pair and the aggregated confidence value; provide access to the rule of the rules-based model to a user via a model management interface; update the rule of the rules-based model based on rule change instructions received from the user via the model management interface; and generate an output value from the updated rule of the rules-based model based on input feature data of a data source.

An example computerized method for creating and managing an editable rules-based model comprises: training, by a processor, a model to generate an output value based on input feature data of a data source; generating, by the processor, using the trained model, results including a feature-output value pair and an associated confidence value for each data source of a plurality of data sources; aggregating, by the processor, the confidence values associated with the feature-output value pair for each data source of the plurality of data sources to form an aggregated confidence value of the feature-output value pair; building, by the processor, a rule of a rules-based model using the feature-output value pair and the aggregated confidence value; providing, by the processor, access to the rules of the rules-based model to a user via a model management interface; updating, by the processor, the rule of the rules-based model based on rule change instructions received from the user via the model management interface; and generating, by the processor, an output value from the updated rule of the rules-based model based on input feature data of a data source.

One or more computer storage media have computer-executable instructions for creating and managing an editable rules-based model that, upon execution by a processor, that cause the processor to at least: train a model to generate an output value based on input feature data of a data source; generate, using the trained model, results including a feature-output value pair and an associated confidence value for each data source of a plurality of data sources; aggregate the confidence values associated with the feature-output value pair for each data source of the plurality of data sources to form an aggregated confidence value of the feature-output value pair; build a rule of a rules-based model using the feature-output value pair and the aggregated confidence value; provide access to the rule of the rules-based model to a user via a model management interface; update the rule of the rules-based model based on rule change instructions received from the user via the model management interface; and generate an output value from the updated rule of the rules-based model based on input feature data of a data source.

Alternatively, or in addition to the other examples described herein, examples include any combination of the following:
  wherein aggregating the confidence values associated with the feature-output value pair includes: combining confidence values of generated results that include the feature-output value pair into a total confidence value; and dividing the total confidence value by a quantity of generated results that include the feature-output value pair to determine an aggregated confidence value of the feature-output value pair.
  wherein generating the output value from the updated rule of the rules-based model includes: applying a plurality of rules of the rules-based model including the updated rule to the input feature data; based on application of the plurality of rules to the input feature data, generating a set of output values and associated confidence values; selecting an output value associated with a highest confidence value from the set of output values and associated confidence values; and providing the selected output value.
  wherein the rule change instructions include at least one of the following: an instruction to create a rule, an instruction to change a rule, and an instruction to delete a rule.
  wherein providing access to the rules of the rules-based model to a user via a model management interface further includes: displaying the rules of the rules-based model including editable interface components associated with the confidence value of the rule; and enabling the user of the model management interface to change the confidence values of the rules by interacting with the editable interface components, wherein rule change instructions are received from the model management interface based on interactions with the editable interface components.
  further comprising: identifying a biased rule in the rules-based model based on a set of at least one bias identification pattern; and providing a notification of the identified biased rules via the model management interface, wherein the user of the model management interface is enabled to change the identified biased rule.
  wherein each data source is associated with a consumer and feature data of each data source includes at least one of the following: age data, gender data, race data, ethnicity data, location data, date-time data, or purchase history data; and wherein the generated output value associated with the data source includes at least one of the following: an item an associated consumer is predicted to purchase, an action to be recommended to an associated consumer, and media to be recommended to an associated consumer.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for training, by a processor, a model to generate an output value based on input feature data of a data source; exemplary means for generating, by the processor, using the trained model, results including a feature-output value pair and an associated confidence value for each data source of a plurality of data sources; exemplary means for aggregating, by the processor, the confidence values associated with the feature-output value pair for each data source of the plurality of data sources to form an aggregated confidence value of the feature-output value pair; exemplary means for building, by the processor, a rule of a rules-based model using the feature-output value pair and the aggregated confidence value; exemplary means for providing, by the processor, access to the rules of the rules-based model to a user via a model management interface; exemplary means for updating, by the processor, the rule of the rules-based model based on rule change instructions received from the user via the model management interface; and exemplary means for generating, by the processor, an output value from the updated rule of the rules-based model based on input feature data of a data source.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor; and
    at least one memory comprising computer program code, the at least one memory and the computer program code configured to, with the at least one processor, cause the at least one processor to:
    train a model to generate an output value based on input feature data of a data source;
    generate, using the trained model, a feature-output value pair and an associated confidence value for each data source of a plurality of data sources;
    aggregate the confidence values associated with the feature-output value pair for each data source of the plurality of data sources to form an aggregated confidence value of the feature-output value pair;
    build a rule of a rules-based model using the feature-output value pair and the aggregated confidence value;
    provide access to the rule of the rules-based model to a user via a model management interface;
    update the rule of the rules-based model based on rule change instructions received from the user via the model management interface; and
    generate an output value from the updated rule of the rules-based model based on input feature data of a data source.

2. The system of claim 1, wherein the at least one memory and the computer program code are configured to, with the at least one processor, further cause the at least one processor to:
    identify a biased rule in the rules-based model based on a set of at least one bias identification pattern; and
    provide a notification of the identified biased rule via the model management interface, wherein the user of the model management interface is enabled to change the identified biased rule.

3. The system of claim 1, wherein providing access to the rule of the rules-based model to a user via a model management interface further includes:
    displaying the rule of the rules-based model including editable interface components associated with the confidence value of the rule; and
    enabling the user of the model management interface to change the confidence value of the rule by interacting with the editable interface components, wherein the rule change instructions are received from the model management interface based on interactions with the editable interface components.

4. The system of claim 1, wherein aggregating the confidence values associated with the feature-output value pair includes:
    combining the confidence values into a total confidence value; and
    dividing the total confidence value by a quantity of the plurality of data sources to determine an aggregated confidence value of the feature-output value pair.

5. The system of claim 1, wherein generating the output value from the updated rule of the rules-based model includes:
    applying a plurality of rules of the rules-based model including the updated rule to the input feature data;
    based on application of the plurality of rules to the input feature data, generating a set of output values and associated confidence values;
    selecting an output value associated with a highest confidence value from the set of output values and associated confidence values; and
    providing the selected output value.

6. The system of claim 1, wherein the rule change instructions include at least one of the following: an instruction to create a rule, an instruction to change a rule, an instruction to delete a rule.

7. The system of claim 1, wherein each data source is associated with a consumer and feature data of each data source includes at least one of the following: age data, gender data, race data, ethnicity data, location data, date-time data, or purchase history data; and
    wherein the generated output value associated with the data source includes at least one of the following: an item an associated consumer is predicted to purchase, an action to be recommended to an associated consumer, and media to be recommended to an associated consumer.

8. A computerized method for creating and managing an editable rules-based model, the computerized method comprising:
    training, by a processor, a model to generate an output value based on input feature data of a data source;

generating, by the processor, using the trained model, a feature-output value pair and an associated confidence value for each data source of a plurality of data sources;

aggregating, by the processor, the confidence values associated with the feature-output value pair for each data source of the plurality of data sources to form an aggregated confidence value of the feature-output value pair;

building, by the processor, a rule of a rules-based model using the feature-output value pair and the aggregated confidence value;

providing, by the processor, access to the rules of the rules-based model to a user via a model management interface;

updating, by the processor, the rule of the rules-based model based on rule change instructions received from the user via the model management interface; and generating, by the processor, an output value from the updated rule of the rules-based model based on input feature data of a data source.

9. The computerized method of claim 8, further comprising:

identifying a biased rule in the rules-based model based on a set of at least one bias identification pattern; and providing a notification of the identified biased rule via the model management interface, wherein the user of the model management interface is enabled to change the identified biased rule.

10. The computerized method of claim 8, wherein providing access to the rules of the rules-based model to a user via a model management interface further includes:

displaying the rules of the rules-based model including editable interface components associated with the confidence value of the rule; and enabling the user of the model management interface to change the confidence values of the rules by interacting with the editable interface components, wherein the rule change instructions are received from the model management interface based on interactions with the editable interface components.

11. The computerized method of claim 8, wherein aggregating the confidence values associated with the feature-output value pair includes:

combining the confidence values into a total confidence value; and dividing the total confidence value by a quantity of the plurality of data sources to determine an aggregated confidence value of the feature-output value pair.

12. The computerized method of claim 8, wherein generating the output value from the updated rule of the rules-based model includes:

applying a plurality of rules of the rules-based model including the updated rule to the input feature data;

based on application of the plurality of rules to the input feature data, generating a set of output values and associated confidence values;

selecting an output value associated with a highest confidence value from the set of output values and associated confidence values; and providing the selected output value.

13. The computerized method of claim 8, wherein the rule change instructions include at least one of the following: an instruction to create a rule, an instruction to change a rule, an instruction to delete a rule.

14. The computerized method of claim 8, wherein each data source is associated with a consumer and feature data of each data source includes at least one of the following: age data, gender data, race data, ethnicity data, location data, date-time data, or purchase history data; and wherein the generated output value associated with the data source includes at least one of the following: an item an associated consumer is predicted to purchase, an action to be recommended to an associated consumer, and media to be recommended to an associated consumer.

15. One or more computer storage media having computer-executable instructions for creating and managing an editable rules-based model that, upon execution by a processor, cause the processor to at least:

train a model to generate an output value based on input feature data of a data source;

generate, using the trained model, a feature-output value pair and an associated confidence value for each data source of a plurality of data sources;

aggregate the confidence values associated with the feature-output value pair for each data source of the plurality of data sources to form an aggregated confidence value of the feature-output value pair;

build a rule of a rules-based model using the feature-output value pair and the aggregated confidence value;

provide access to the rule of the rules-based model to a user via a model management interface;

update the rule of the rules-based model based on rule change instructions received from the user via the model management interface; and generate an output value from the updated rule of the rules-based model based on input feature data of a data source.

16. The one or more computer storage media of claim 15, wherein the computer-executable instructions, upon execution by a processor, further cause the processor to at least:

identify a biased rule in the rules-based model based on a set of at least one bias identification pattern; and provide a notification of the identified biased rules via the model management interface, wherein the user of the model management interface is enabled to change the identified biased rule.

17. The one or more computer storage media of claim 15, wherein providing access to the rules of the rules-based model to a user via a model management interface further includes:

displaying the rules of the rules-based model including editable interface components associated with the confidence value of the rule; and enabling the user of the model management interface to change the confidence value of the rule by interacting with the editable interface components, wherein the rule change instructions are received from the model management interface based on interactions with the editable interface components.

18. The one or more computer storage media of claim 15, wherein aggregating the confidence values associated with the feature-output value pair includes:

combining the confidence values into a total confidence value; and dividing the total confidence value by a quantity of the plurality of data sources to determine an aggregated confidence value of the feature-output value pair.

19. The one or more computer storage media of claim 15, wherein generating the output value from the updated rule of the rules-based model includes:

applying a plurality of rules of the rules-based model including the updated rule to the input feature data;

based on application of the plurality of rules to the input feature data, generating a set of output values and associated confidence values;

selecting an output value associated with a highest confidence value from the set of output values and associated confidence values; and providing the selected output value.

20. The one or more computer storage media of claim 15, wherein the rule change instructions include at least one of the following: an instruction to create a rule, an instruction to change a rule, an instruction to delete a rule.

* * * * *

UNITED STATES PATENT AND TRADEMARK OFFICE
CERTIFICATE OF CORRECTION

| | |
|---|---|
| PATENT NO. | : 11,615,077 B1 |
| APPLICATION NO. | : 17/411033 |
| DATED | : March 28, 2023 |
| INVENTOR(S) | : Michal Adam Sroka et al. |

It is certified that error appears in the above-identified patent and that said Letters Patent is hereby corrected as shown below:

On the Title Page

After item (22) Filed: August 24, 2021, insert:
-- (65) Prior Publication Data
US 2023/0069002 A1 March 2, 2023 --

Signed and Sealed this
First Day of October, 2024

Katherine Kelly Vidal
*Director of the United States Patent and Trademark Office*